US009908958B2

(12) United States Patent
Van Rheenen et al.

(10) Patent No.: US 9,908,958 B2
(45) Date of Patent: *Mar. 6, 2018

(54) PROCESSING AIDS AND POLYMER FORMULATIONS CONTAINING THE SAME AND METHOD FOR PRODUCING THE SAME

(75) Inventors: Paul R. Van Rheenen, Warminster, PA (US); Steven P. Broadwater, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/366,749

(22) PCT Filed: Dec. 28, 2011

(86) PCT No.: PCT/US2011/067655
§ 371 (c)(1),
(2), (4) Date: Aug. 20, 2014

(87) PCT Pub. No.: WO2013/100997
PCT Pub. Date: Jul. 4, 2013

(65) Prior Publication Data
US 2014/0371396 A1 Dec. 18, 2014

(51) Int. Cl.
| C08L 27/00 | (2006.01) |
| C08F 220/18 | (2006.01) |
| C08F 2/00 | (2006.01) |
| C08F 2/22 | (2006.01) |
| C08L 51/00 | (2006.01) |
| C08L 27/06 | (2006.01) |
| C08L 33/12 | (2006.01) |

(52) U.S. Cl.
CPC ............ *C08F 220/18* (2013.01); *C08F 2/001* (2013.01); *C08F 2/005* (2013.01); *C08F 2/22* (2013.01); *C08L 27/00* (2013.01); *C08L 27/06* (2013.01); *C08L 33/12* (2013.01); *C08L 51/003* (2013.01); *C08L 2205/06* (2013.01)

(58) Field of Classification Search
CPC ..... C08F 220/18; C08L 33/12; C08L 2205/06
See application file for complete search history.

(56) References Cited

U.S. PATENT DOCUMENTS

| 2,646,417 | A | | 7/1953 | Jennings |
| 3,261,785 | A | | 7/1966 | Robinson |
| 3,833,686 | A | * | 9/1974 | Grochowski et al. .......... 525/80 |
| 3,975,315 | A | | 8/1976 | Parks |
| 4,808,649 | A | | 2/1989 | Gay et al. |
| 4,956,222 | A | | 9/1990 | Matsuura et al. |
| 5,206,296 | A | | 4/1993 | Dominique et al. |
| 5,561,034 | A | | 10/1996 | Desie et al. |
| 5,663,266 | A | | 9/1997 | Taylor et al. |
| 6,670,419 | B2 | | 12/2003 | Lau et al. |
| 6,765,033 | B1 | | 7/2004 | Sunagawa et al. |
| 6,852,800 | B2 | | 2/2005 | Cruz et al. |
| 7,795,343 | B2 | | 9/2010 | Alderfer et al. |
| 2003/0027881 | A1 | | 2/2003 | Sunagawa et al. |
| 2009/0093560 | A1 | | 4/2009 | Van Rheenen et al. |
| 2012/0208963 | A1 | | 8/2012 | Van Rheenen et al. |

FOREIGN PATENT DOCUMENTS

| DE | 4125477 | 2/1992 |
| EP | 0335365 | 10/1989 |
| EP | 0492301 | 7/1992 |
| EP | 1065242 | 1/2001 |
| EP | 1153936 | 11/2001 |
| EP | 1245643 | 10/2002 |
| EP | 1637561 | 3/2006 |
| EP | 1798258 | 6/2007 |

OTHER PUBLICATIONS

EPO Office Action dated Aug. 5, 2014 for counterpart European Application No. EP11811281.2, 9 pages.
Response to EPO Office Action dated Aug. 5, 2014 filed Jan. 20, 2015 for counterpart European Application No. EP11811281.2, 7 pages.
PCT/US2011/067655 International Search Report dated Jan. 15, 2013, 4 pages.
PCT/US2011/067655 Written Opinion, 6 pages.
PCT/US2011/067655 International Preliminary Report on Patentability dated Jul. 1, 2014, 7 pages.
Japanese Office Action dated Sep. 1, 2015 for Japanese Application No. 2014-550254, 6 pages.
Chinese Office Action dated Nov. 9, 2015; from Chinese counterpart Application No. 201180075715.8.
Chinese Response to Office Action dated Jan. 24, 2016; from Chinese counterpart Application No. 201180075715.8.
Korean Office Action dated Jun. 15, 2017; from Korean counterpart Application No. 10-2014-7017292.
Japanese Office Action dated Jul. 19, 2016; from Japanese counterpart Application No. 2014-550254.
Japanesel Office Action recieved Nov. 1, 2017; from Japanese counterpart Application No. 2014-550254.

* cited by examiner

Primary Examiner — Mark S Kaucher

(57) ABSTRACT

A multi-stage emulsion processing aid polymer comprising one or more functionalized ethylenically unsaturated monomer into the emulsion polymerization reactor, wherein the functionality is selected from the group consisting of β-keto esters, β-keto amides, β-diketones, cyanoacetic esters, malonates, nitroalkanes, β-nitro esters, sulfonazides, thiols, thiol-s-triazines, and amine, where the functionality is incorporated into polymers by polymerizing, ethylenically unsaturated monomers containing these functionalities or by post functionalization of a polymer with additional reactions after polymerization in one of the first or second stages. Foamable halogenated polymers comprising the multi-stage emulsion processing aid polymer is also provided. Also provided are methods for making the multi-stage emulsion processing aid polymer and foamable halogenated polymers.

7 Claims, No Drawings

PROCESSING AIDS AND POLYMER FORMULATIONS CONTAINING THE SAME AND METHOD FOR PRODUCING THE SAME

FIELD OF INVENTION

This invention relates to a multi-stage emulsion processing aid polymer, a foamable halogenated polymer formulation comprising the processing aid polymer, method of producing processing aids and method of producing the foamable polymer formulation.

BACKGROUND OF THE INVENTION

Halogenated polymers such as polyvinyl chloride ("PVC") are employed as building materials to replace wood in a variety of applications such as house fascia, trim, and decorative molding mill work. "Halogenated polymers" as used herein means (1) homopolymers or copolymers containing greater than 80% of vinyl chloride, vinyl fluoride, vinylidene chloride, vinylidene fluoride, or combinations and (2) chlorinated polyvinyl chloride, chlorinated polyethylene, or combinations thereof. The most common of these polymers industrially is polyvinyl chloride (PVC) so the general description herein will emphasize PVC and foamed PVC as examples. PVC foam is also used for signage, deck boards, and in the cores of some types of PVC pipe.

Foamed PVC for these various applications is typically made in a continuous extrusion process. The most common extrusion practices involve free foaming out of the die followed by some type of calibration and the Celuka or integrated skin process. A description of these PVC foaming processes and typical formulation ingredients can be found in D. Klempner and V. Sendijarevic, "PVC Foams", Chapter 9, *Handbook of Polymeric Foams and Foam Technology*, 2nd Ed., Hanser Publishers, Munich (2004).

Key components of foamed PVC formulations are PVC, thermal stabilizer, lubricants, one or more blowing agents, and (co)polymers additives such as impact modifiers and processing aid polymers. The processing aid polymers are materials that are compatible with PVC and tend to be copolymers that are high in methyl methacrylate or other compositions that are compatible with PVC, for example, styrene acrylonitrile copolymers. U.S. Pat. Nos. 2,646,417, 3,975,315, 5,206,296, and 6,765,033 and European Patent No. EP 1153936 describe the types of polymer compositions used as processing aids for PVC. "Compatible" as used herein means that the processing aid polymer mixes or disperses uniformly into the PVC during thermal processing.

High molecular weight processing aids provide polymer expansion or die swell during polymer processing when the heated polymer exits the extruder die. This expansion is important in processes such as the Celuka process in which polymer expansion is required to fill the cavity or in free foam where a certain sheet thickness is required. These processing aid polymers also increase melt extensibility and strength due to their high molecular weight and compatibility with PVC. This in turn helps control the foam cell expansion and provides a small uniform cell size. Additionally, high melt strength helps prevent foam collapse while the extruded foam sheet is cooling and helps lock in the foam structure. High melt strength, in addition, allows the pulling of hot extruded material through sizing or calibrating equipment. Any scrap or trim material can be ground up and reused in the extrusion process in that the foamed material is a thermoplastic and not a cross linked thermoset material. Being able to recycle the material as regrind is important for economics and waste handling.

It is not unusual for these processing aids to have weight average molecular weights in the 0.5 to 15 million range with the higher MW materials showing greater efficiency (B. Haworth et al., *Plastics, Rubber and Composites Processing and Applications*, vol. 22, p. 159, 1994). Use levels can fall in the range of 0.5 to 20 parts per hundred on PVC in the formulation depending on the processing aid MW, the desired density, and sheet thickness. Lower density and higher sheet thickness require higher processing aid use levels.

An alternative to the use of high MW processing aids to allow foaming is to use a cross linking agent for the matrix polymer. The cross linking agent must cure at a temperature and rate similar to the decomposition of the chemical blowing agents to set the foam. This approach is used in industry to make polyurethane, epoxy foams, and the like D. Klempner and V. Sendijarevic, *Handbook of Polymeric Foams and Foam Technology*, 2nd Ed., Hanser Publishers, Munich (2004).

This curing approach has also been used for halogenated polymers like PVC. In a typical approach, PVC, blowing agent, and cross linking agent are combined together and placed in a mold under pressure. The mold is heated to the temperature that causes the blowing agent to generate gas and the pressure is released causing foaming and curing to occur in the same time frame. In this way, the foam structure is locked in and a thermoset material is generated that has high heat resistance and resistance to compression set, but scrap from the foam cannot easily be reprocessed. Also, this type of approach does not lend itself to extrusion type foaming processes as curing tends to occur inside the extruder.

Examples for this type of approach include U.S. Pat. No. 3,261,785, where a non-polymeric poly functional sulfonazide is used as a cross linker for PVC. In U.S. Pat. No. 4,956,222, an isocyanate curing agent is used with plasticized PVC where the PVC contains active hydrogen functionality, or an acrylic polymer with active hydrogen functionality is blended with the PVC and cured with an isocyanate. In *European Polymer Journal*, vol. 36, p. 2235 (2000), cross linking of PVC foam through the use of peroxides and trimethacrylate monomers is described. These approaches have the limitations that scrap cannot be reprocessed. Also, this type of approach does not lend itself to extrusion type foaming processes as controlling the curing rate so that the material does not cure in the extruder and cause melt viscosity issues is difficult.

SUMMARY OF THE INVENTION

The instant invention is a processing aid, foamable halogenated polymer formulations containing the processing aid, and method of producing the processing aids and polymer formulations. We have found that by staging the addition of the functionalized ethylenically unsaturated monomer in one stage of a multi-stage polymerization, we can further increase the utility of U.S. application Ser. No. 12/283,934, filed on Sep. 17, 2008, which claimed priority to U.S. Provisional Application No. 60/997,880, filed on Oct. 5, 2007, by increasing the molecular weight of the polymer at a constant functionalized ethylenically unsaturated monomer level.

The invention provides a multi-stage emulsion processing aid polymer comprising from 25 to 75 percent by weight first stage polymer which comprises units derived from nonfunctional ethylenically unsaturated monomer; and from 25 to 75 percent by weight second stage polymer which comprises units derived from one or more functionalized ethylenically unsaturated monomer into the emulsion polymerization reactor, wherein the functionality is selected from the group consisting of β-keto esters, β-keto amides, β-diketones, cyanoacetic esters, malonates, nitroalkanes, β-nitro esters, sulfonazides, thiols, thiol-s-triazines, and amine, where the functionality is incorporated into polymers by polymerizing, ethylenically unsaturated monomers containing these functionalities or by post functionalization of a polymer with additional reactions after polymerization; and wherein the processing aid polymer has a Mw equal to or greater than 700,000. In such embodiment, the first stage contains no units derived from functionalized monomers.

In alternative embodiments, the invention provides a processing aid polymer wherein the functional group is in the first stage of a multi-stage polymer, foamable halogenated polymer formulations containing the inventive processing aids, and methods of producing the processing aids and the foamable halogenated polymer formulations.

DETAILED DESCRIPTION OF THE INVENTION

The instant invention is a multi-stage emulsion processing aid polymer, foamable halogenated formulation containing the processing aid polymer, method of producing processing aids and method of producing the foamable halogenated polymer formulations containing the same.

A first embodiment of the multi-stage emulsion processing aid polymer comprises: from 25 to 75 percent by weight first stage polymer which comprises units derived from non-functional ethylenically unsaturated monomer; and from 25 to 75 percent by weight second stage polymer which comprises 0 to 99.6 mole % units derived from one or more non-functional ethylenically unsaturated monomer(s) and 0.4 to 100 mole % units derived from one or more functionalized ethylenically unsaturated monomer(s) into the emulsion polymerization reactor, wherein the functionality is selected from the group consisting of β-keto esters, β-keto amides, β-diketones, cyanoacetic esters, malonates, nitroalkanes, β-nitro esters, sulfonazides, thiols, thiol-s-triazines, and amine, where the functionality is incorporated into polymers by polymerizing, ethylenically unsaturated monomers containing these functionalities or by post functionalization of a polymer with additional reactions after polymerization; and wherein the processing aid polymer has a Mw equal to or greater than 700,000. In such embodiment, the first stage contains no units derived from functionalized monomers.

A second embodiment of the multi-stage emulsion processing aid polymer comprises from 25 to 75 percent by weight first stage polymer which comprises 0 to 99.6 mole % units derived from one or more non-functional ethylenically unsaturated monomer(s) and 0.4 to 100 mole % units derived from one or more functionalized ethylenically unsaturated monomer(s) into the emulsion polymerization reactor, wherein the functionality is selected from the group consisting of β-keto esters, β-keto amides, β-diketones, cyanoacetic esters, malonates, nitroalkanes, β-nitro esters, sulfonazides, thiols, thiol-s-triazines, and amine, where the functionality is incorporated into polymers by polymerizing, ethylenically unsaturated monomers containing these functionalities or by post functionalization of a polymer with additional reactions after polymerization; and from 25 to 75 percent by weight second stage polymer which comprises units derived from non-functional ethylenically unsaturated monomer; and wherein the processing aid polymer has a Mw equal to or greater than 700,000. In such embodiment, the second stage contains no units derived from functionalized monomers.

All individual values and subranges from 25 to 75 percent by weight first stage are included herein and disclosed herein; for example, the first stage in the multi-stage polymer can be from a lower limit of 25, 30, 35, 40, 45, 50, 55, 60, 65, or 70 weight percent to an upper limit of 30, 35, 40, 45, 50, 55, 60, 65, 70 or 75 weight percent. For example, the weight percent of first stage may be in the range of from 25 to 75 weight percent, or in the alternative, from 25 to 50 weight percent, or in the alternative from 40 to 70 weight percent.

All individual values and subranges from 25 to 75 percent second stage by are included herein and disclosed herein; for example, the weight percent of the second stage in the multi-stage polymer can be from a lower limit of 25, 30, 35, 40, 45, 50, 55, 60, 65, or 70 weight percent to an upper limit of 30, 35, 40, 45, 50, 55, 60, 65, 70 or 75 weight percent. For example, the weight percent of weight of the second stage may be in the range of from 25 to 75 weight percent, or in the alternative, from 50 to 75 weight percent, or in the alternative from 30 to 60 weight percent.

The processing aid polymer may have a weight average molecular weight (Mw) of equal to or greater than 700,000. All individual values and subranges of equal to or greater than 700,000 are disclosed herein and included herein. For example the Mw of the processing aid polymer may be from a lower limit of 700,000; 800,000; 900,000; 1 million; 1.2 million; 1.4 million; 1.6 million; or 1.8 million.

The invention further provides a multi-stage emulsion processing aid polymer according to any one of the foregoing embodiments wherein the functionalized ethylenically unsaturated monomer is selected from the group of β-keto esters and amides, β-diketones, cyanoacetic esters, malonates, nitroalkanes and β-nitro esters.

The invention further provides a multi-stage emulsion processing aid polymer according to any one of the foregoing embodiments wherein the functionalized ethylenically unsaturated monomer is selected from the group of acetoacetoxyethyl(meth)acrylate (AAEM), acetoacetoxypropyl (meth)acrylate, acetoacetoxybutyl(meth)acrylate, 2,3-di(acetoacetoxy)propyl(meth)acrylate, acetoacetoxyethyl(meth) acrylamide, 2-cyanoacetoxyethyl(meth)acrylate, 2-cyanoacetoxyethyl(meth)acrylamide, N-cyanoacetyl-N-metylaminoethyl(meth)acrylate, N-(2 propionylacetoxybutyl) (meth)acrylamide.

The invention further provides a multi-stage emulsion processing aid polymer according to any one of the foregoing embodiments wherein the functionalized ethylenically unsaturated monomer is AAEM.

Suitable for use as nonfunctional co-monomers (with the functionalized monomers described above) in the processing aid polymers are monoethylenically unsaturated monomers such as alkyl acrylates in which the alkyl group contains no more than eighteen carbon atoms, preferably no more than eight carbon atoms; alkyl methacrylates in which the alkyl portion contains no more than eighteen carbon atoms, preferably no more than eight carbon atoms; acrylonitrile; methacrylonitrile; acrylic acid; methacrylic acid; styrene; and substituted styrenes particularly alkyl substituted styrenes wherein the alkyl group contains no more than fourteen carbon atoms, and other vinyl monomers like vinyl chloride, ethylene, vinyl acetate and vinyl versitate. Typical of the suitable co-monomers are ethyl acrylate, butyl acrylate, 2-ethylhexyl acrylate, methyl methacrylate, butyl methacrylate, tert-butyl methacrylate, cyclohexyl methacrylate, hydroxyethylmethacrylate, acrylonitrile, methacrylonitrile, acrylic acid, methacrylic acid, styrene, o-chlorostyrene and α-methyl styrene. Styrene, acrylonitrile, butyl acrylate, butyl methacrylate, ethyl acrylate, methyl methacrylate, and combinations thereof are the preferred monomers. Likewise the functionality can be polymerized into a copolymer of polyethylene that is then chlorinated to make the processing aid polymer compatible with PVC or other halogenated polymers.

In an alternative embodiment, the instant invention further provides a multi-stage emulsion polymerization process comprising: feeding water, at least one non-functionalized ethylenically unsaturated monomer and surfactant into an emulsion polymerization reactor, thereby forming a first stage polymer of a multi-stage emulsion polymer wherein the first stage polymer comprises from 25% to 75% by weight of the total weight of the multistage emulsion polymer; feeding one or more functionalized ethylenically unsaturated monomer into the emulsion polymerization reactor, wherein the functionality is selected from the group consisting of β-keto esters, β-keto amides, β-diketones, cyanoacetic esters, malonates, nitroalkanes, β-nitro esters, sulfonazides, thiols, thiol-s-triazines, and amine, where the functionality is incorporated into polymers by polymerizing, ethylenically unsaturated monomers containing these functionalities or by post functionalization of a polymer with additional reactions after polymerization, into the emulsion polymerization reactor to form a second stage polymer, in the presence of the first stage polymer, wherein the second stage polymer comprises from 25% to 75% by weight of the total weight of the multistage emulsion polymer; and drying, or allowing to dry, the multistage emulsion polymer thereby forming a multistage emulsion polymer processing aid.

In an alternative embodiment, the instant invention further provides a multi-stage emulsion polymerization process comprising: feeding water, one or more functionalized ethylenically unsaturated monomer into the emulsion polymerization reactor, wherein the functionality is selected from the group consisting of β-keto esters, β-keto amides, β-diketones, cyanoacetic esters, malonates, nitroalkanes, β-nitro esters, sulfonazides, thiols, thiol-s-triazines, and amine, where the functionality is incorporated into polymers by polymerizing, ethylenically unsaturated monomers containing these functionalities or by post functionalization of a polymer with additional reactions after polymerization, and surfactant into an emulsion polymerization reactor, thereby forming a first stage polymer of a multi-stage emulsion polymer wherein the first stage polymer comprises from 25% to 75% by weight of the total weight of the multistage emulsion polymer; feeding at least one non-functionalized ethylenically unsaturated monomer into the emulsion polymerization reactor, to form a second stage polymer, in the presence of the first stage polymer, wherein the second stage polymer comprises from 25% to 75% by weight of the total weight of the multistage emulsion polymer, and drying, or allowing to dry, the multistage emulsion polymer thereby forming a multistage emulsion polymer processing aid.

In an alternative embodiment, the instant invention further provides a process for producing a foamable halogenated polymer formulation comprising: blending (a) from 20 to 99% by weight of one or more halogenated polymers selected from homopolymers or copolymers comprising at least 80% by weight of the halogenated polymer of one or more monomers selected from vinyl chloride, vinyl fluoride, vinylidene chloride, and vinylidene fluoride, and chlorinated polyvinyl chloride, and chlorinated polyethylene; with from 0.5 to 20% by weight of one or more multistage emulsion polymer processing aid produced according to an embodiment of the inventive process.

In an alternative embodiment, the instant invention further provides the process according to any one of the foregoing embodiments wherein the functionalized ethylenically unsaturated monomer is selected from the group of β-keto esters and amides, β-diketones, cyanoacetic esters, malonates, nitroalkanes and β-nitro esters. In an alternative embodiment, the instant invention further provides the process according to any one of the foregoing embodiments wherein the substituted ethylenically unsaturated monomer is selected from the group of acetoacetoxyethyl(meth)acrylate, acetoacetoxypropyl(meth)acrylate, acetoacetoxybutyl (meth)acrylate, 2,3-di(acetoacetoxy) propyl(meth)acrylate, acetoacetoxyethyl(meth)acrylamide, 2-cyanoacetoxyethyl (meth)acrylate, 2-cyanoacetoxyethyl(meth)acrylamide, N-cyanoacetyl-N-metylaminoethyl(meth)acrylate, N-(2 propionylacetoxybutyl) (meth)acrylamide.

In an alternative embodiment, the instant invention further provides the process according to any one of the foregoing embodiments wherein the functionalized ethylenically unsaturated monomer is acetoacetoxyethyl methacrylate (AAEM).

The functional groups can be incorporated into processing aid polymers by the copolymerization of ethylenically unsaturated monomers that contain these functionalities with other ethylenically unsaturated monomers used to make such processing aid polymers. Polymerization can be by solution, suspension, emulsion, or bulk polymerization provided the polymerization results in random copolymers. Such functionalities are activated methylene or methyne groups that can be involved in Michael addition reactions. Such functional groups include β-keto esters and amides, β-diketones, cyanoacetic esters, malonates, nitroalkanes and β-nitro esters.

Alternately, the functional groups can be incorporated into the processing aid polymer by making the polymer and then post functionalizing it with subsequent reactions. For example, a polymer containing β-keto ester functional groups can be produced by post functionalizing a hydroxyl containing polymer with diketene.

Another useful additional functional group that can be incorporated into monomers for polymerization is sulfonazide, (a.k.a. sulphonazide). Examples of how to make these sulfonazide-containing monomers are given in GB 1138929. Vinyl, vinylidene, and styryl compounds containing the sulphonazide groups are such suitable monomers. Particularly interesting examples of such monomers in GB 1138929 are m- and p-methacryloylaminophenyl sulphonazide, m- and p-acryloylaminophenyl sulphonazide, and reaction products of 1 mole of 3- or 4-sulphonazidophenyl isocyanate with 1 mole of vinyl or vinylidene monomers containing hydroxyl groups, for example with hydroxypropyl(meth) acrylate or hydroxyethyl(meth)acrylate.

Other reactive functionality to incorporate into processing aid polymers by the appropriate monomers or post functionalization of a polymer after polymerization are thiol, thiol-s-triazines, and amino functionality.

The functional monomers are used at levels of 0.4 to 100 mole % in the polymer stage containing functional monomer. All individual values and subranges from 0.4 to 100 mole % are disclosed and included herein; for example, the amount of units derived from functional monomers may be from a lower limit of 0.4, 10, 20, 30, 40, 50, 60, 70, 80, or 90 mole % to an upper limit of 10, 20, 30, 40, 50, 60, 70, 80, 90, or 100 mole %. For example, the amount of units derived from functional monomers may be in the range from 0.4 to 100 mole %, or in the alternative, from 10 to 90 mole %, or in the alternative, from 0.5 to 20 mole %.

In the stage containing one or more functional monomer(s), one or more non-functional monomer(s) are used at level from 0 to 99.6 mole %. All individual values and subranges from 0 to 99.6 mole % units derived from one or more non-functional ethylenically unsaturated monomer(s) are included herein and disclosed herein; for example the amount of units derived from one or more non-functional unsaturated monomer(s) can be from a lower limit of 0, 10, 20, 30, 40, 50, 60, 70, 80, or 90 mole percent (mole %) to an upper limit of 10, 20, 30, 40, 50, 60, 70, 80, 90, or 99.6 mole %. For example, the amount of non-functional ethylenically unsaturated monomer(s) may be in the range from 0 to 99.6 mole %, or in the alternative, from 20 to 90 mole %, or in the alternative, from 30 to 80 mole %, or in the alternative, from 0 to 75 mole %.

Since a crosslinking or curing reaction is thought to occur between the functional groups of the processing aid and the halogenated polymer as a means of lightly crosslinking the system to control melt viscosity, there is a desired range of functionality in terms of moles of functionality provided by the processing aid per 100 grams of halogenated polymer. Too low a level of functionality and the desired increase in melt viscosity will not occur. Too high a level of functionality and too much insoluble gel will occur and the halogenated polymer will no longer be processible as a thermoplastic. The desired range is 0.00040 to 0.0056 moles of monomer repeat units of one or more of the listed functionalities per 100 grams of halogenated polymer. Loading levels of 0.5 to 20 parts per hundred based on halogenated polymer of the processing aid can be used to deliver the functionality where the use percentage will depend on the level of functionality in the processing aid.

In some embodiments, the processing aid polymers are materials with a weight average molecular weight from 0.7 to 13 million, or in the alternative, from 1 to 13 million, or in the alternative, from 1.6 to 13 million. The definition of weight average molecular weight is found in *The Elements of Polymer Science and Engineering*, Alfred Rudin, Academic Press, p. 42, 1982. The method of molecular weight measurement is given in the experimental test method section below.

The processing aid polymers preferably have a Tg greater than 10° C. and below 150° C. An even more desired range is 55° C. to 150° C. as this makes it easier to isolate the polymer as powder or pellets. "Tg" is the "glass transition temperature" of a polymeric phase. The glass transition temperature of a polymer is the temperature at which a polymer transitions from a rigid, glassy state at temperatures below its Tg to a fluid or rubbery state at temperatures above Tg. The Tg of a polymer is measured by differential scanning calorimetry (DSC) using the mid-point in the heat flow versus temperature transition as the Tg value. For the purposes of this measurement, a heating rate for the DSC measurement is 20° C. per minute.

The processing aid polymers should be compatible with the base halogenated polymer(s) that is/are being foamed. By "compatible" we mean that the processing aid polymer mixes or disperses uniformly into the base polymer during thermal processing. The mixture may not be optically clear, but a single glass transition temperature, Tg, for the blended polymers is generally seen. At the very least, if separate Tgs are seen for the blended polymers, they are shifted by the presence of the other polymer(s).

The processing aid polymers are typically isolated to form a free-flowing powder or pellets, the powder particles having a 50-500 micron mean diameter. This processing aid polymer is subsequently added to thermoplastic foam formulations.

The foamable polymer formulation of this invention optionally further comprises 0.1 to 6% by weight of a blowing agent. All individual values and subranges from 0.1 to 6% by weight are included herein and disclosed herein; for example, the amount of blowing agent in the formulation can be from a lower limit of 0.1, 1.5, 2, 2.5, 3, 3.8, 4, 4.5, 5 or 5.8% by weight to an upper limit of 0.5, 1.2, 2.6, 3.9, 4, 5.3 or 6% by weight. For example, the amount of blowing agent in the polymer formulation may be in the range of from 0.1 to 6% by weight, or in the alternative, from 1 to 5% by weight.

In another embodiment, the invention provides a process for producing a foamable halogenated polymer formulation comprising: blending (a) from 20 to 99% by weight of one or more halogenated polymers (A) selected from. homopolymers or copolymers comprising at least 80% by weight of the halogenated polymer of one or more monomers selected from vinyl chloride, vinyl fluoride, vinylidene chloride, and vinylidene fluoride, and chlorinated polyvinyl chloride, and chlorinated polyethylene; with (b) one or more multi-stage emulsion processing aid polymer having a functional group monomer incorporated into the second stage wherein the one or more the processing aid polymers is used at a level in the formulation to provide 0.00040 to 0.0056 moles of monomer repeat units of one or more functionalities per 100 g of halogenated polymers.

In another embodiment, the invention provides a process for producing a foamable halogenated polymer formulation comprising: blending (a) from 20 to 99% by weight of one or more halogenated polymers (A) selected from. homopolymers or copolymers comprising at least 80% by weight of the halogenated polymer of one or more monomers selected from vinyl chloride, vinyl fluoride, vinylidene chloride, and vinylidene fluoride, and chlorinated polyvinyl chloride, and chlorinated polyethylene; with (b) one or more multistage emulsion processing aid polymer having a functional group monomer incorporated into the first stage wherein the one or more the processing aid polymers is used at a level in the formulation to provide 0.00040 to 0.0056 moles of monomer repeat units of one or more functionalities per 100 g of halogenated polymers.

All values and subranges from 00.00040 to 0.0056 moles of monomer repeat units of one or more functionalities per 100 g of halogenated polymers are included herein and disclosed herein; for example the level of processing aid used in forming the foaming halogenated processing aid may be from a lower limit of 00.00040, 0.00095, 0.0015, 0.0025, 0.0035, 0.0045 or 0.005 moles of monomer repeat units of one or more functionalities per 100 g of halogenated polymers to an upper limit of 0.00095, 0.0015, 0.0025, 0.0035, 0.0045, 0.005, or 0.0056 moles of monomer repeat units of one or more functionalities per 100 g of halogenated polymers. For example, the amount of processing aid polymer used in the foamable halogenated polymer formulation may be from 00.00040 to 0.0056, or in the alternative, from 0.00065 to 0.0015, or in the alternative from 0.00095 to 0.005 moles of monomer repeat units of one or more functionalities per 100 g of halogenated polymers.

Chemical blowing agents can be any of a variety of chemical blowing agents which release a gas upon thermal decomposition. The blowing agent or mixtures of agents can be selected from chemicals containing decomposable groups such as azo, N-nitroso, carboxylate, carbonate, heterocyclic nitrogen-containing and sulfonyl hydrazide groups. Generally, they are solid materials that liberate gas(es) when heated by means of a chemical reaction or upon decomposition. Representative compounds include azodicarbonamide and derivatives, bicarbonates, hydrazine derivatives, semicarbazides, tetrazoles, benzoxazines, and borohydrates as outlined in *Plastic Additives Handbook*, Ch. 16, eds. R. Gachter, H. Muller, and P. P. Klemchuk, Hanser Gardner Publishers, Cincinnati (1996). Examples of these blowing agents are azodicarbonamide, 4,4-oxybis(benzenesulfohydrazide), diphenylsulfone-3,3-disulfohydrazide, trihydrazinotriazine, p-toluylenesulfonyl semicarbazide, 5-phenyltetrazole, isatoic anhydride, sodium bicarbonate, and sodium borohydride. In addition to chemical blowing agents, physical blowing agents such as gases and volatile liquids can also be used. Foaming can be generated by super critical gases like $CO_2$ that are injected into the extruder.

The blowing agent may be added to the polymer in several different ways which are known to those skilled in the art, for example, by adding the solid powder, liquid or gaseous agents directly to the resin in the extruder while the resin is in the molten state to obtain uniform dispersal of the agent in the molten plastic. Preferably the blowing agent is added before the extrusion process and is in the form of a solid. The temperature and pressures to which the foamable composition of the invention are subjected to provide a foamed composition will vary within a wide range, depending upon the amount and type of foaming agent that is used.

In addition to the matrix halogenated polymer, functional polymer processing aid and blowing agent, formulations can include thermal stabilizers, light stabilizers, antioxidants, impact modifiers, lubricants, waxes, plasticizers, fillers, fibers, pigments, conventional or nonfunctional processing aid polymers, and other common additives.

EXAMPLES

The following examples illustrate the present invention but are not intended to limit the scope of the invention.

Inventive Examples 1 and 3 were prepared by synthesizing processing aid polymers having AAEM added in the first stage of the multistage emulsion polymerization. The multistage emulsion polymerization was conducted as follows:

Inventive Example 1: 0.000224 mol AAEM per 1.0 g of Processing Aid Polymer

A 5 L round bottom flask was fitted with a stirrer, temperature controller, nitrogen line and condenser. 1245 g of deionized (DI) water, 0.1 g sodium hydroxide (50% aqueous) and 9.84 g DOWFAX 2A1 (46% active) were charged to the kettle. The mixture was warmed under a nitrogen sparge to 40° C. The sparge was switched to a sweep. A monomer mixture of 27.05 g BMA, 81.16 g BA, 569.54 g MMA and 77.66 g AAEM was prepared, and then added to the kettle. Next, a solution of 0.30 g sequestrene (5% active), 0.11 g disodium EDTA and 10 g DI water was added to the reactor. Then, 0.83 g sodium persulfate in 10 g DI water was added. Next, a mixture of 0.10 g lykopon and 0.09 g sodium formaldehyde sulfoxylate in 10 g DI water was added. The reaction was observed to increase in temperature by 41.2° C. over 63 minutes. After reaching peak exotherm, the reaction was cooled to 40° C. Next, 39.38 g DOWFAX 2A1 (46% active) in 20 g DI water was added to the kettle. Then, a monomer mixture of 34.43 g BMA, 103.29 g BA and 724.86 g MMA was prepared and added to the kettle. Next, 0.08 g sodium formaldehyde sulfoxylate in 10 g DI water was added to the kettle. Then, 0.13 g of t-butylhydroperoxide (70% active) in 10 g DI water was added to the kettle. The reaction was observed to increase in temperature by 45.3° C. over 33 minutes. The reaction was cooled to 75° C. and 10.82 g DOWFAX 2A1 (46% active) in 10 g DI water was added. The reaction was cooled to 60° C. and 0.70 g sodium persulfate in 10 g DI water was added and the reaction was held at 60° C. for 30 minutes. The reaction was cooled to 50° C. and 0.63 g sodium sulfate in 10 g DI water was added. The reaction was cooled to 40° C. and filtered through a mesh cloth (52.5% solids).

Inventive Example 3: 0.000112 mol AAEM per 1.0 g of Processing Aid Polymer

A 5 L round bottom flask was fitted with a stirrer, temperature controller, nitrogen line and condenser. 1245 g of deionized (DI) water, 0.1 g sodium hydroxide (50% aqueous) and 9.84 g DOWFAX 2A1 (46% active) were charged to the kettle. The mixture was warmed under a nitrogen sparge to 40° C. The sparge was switched to a sweep. A monomer mixture of 27.05 g BMA, 92.55 g BA, 575.23 g MMA and 38.83 g AAEM was prepared, then added to the kettle. Next, a solution of 0.30 g sequestrene (5% active), 0.11 g disodium EDTA and 10 g DI water was added to the reactor. Then, 0.83 g sodium persulfate in 10 g DI water was added. Next, a mixture of 0.10 g lykopon and 0.09 g sodium formaldehyde sulfoxylate in 10 g DI water was added. The reaction was observed to increase in temperature by 39.3° C. over 61 minutes. After reaching peak exotherm, the reaction was cooled to 40° C. Next, 39.38 g DOWFAX 2A1 (46% active) in 20 g DI water was added to the kettle. Then, a monomer mixture of 34.43 g BMA, 117.79 g BA and 732.11 g MMA was prepared and added to the kettle. Next, 0.08 g sodium formaldehyde sulfoxylate in 10 g DI water was added to the kettle. Then, 0.13 g of t-butylhydroperoxide (70% active) in 10 g DI water was added to the kettle. The reaction was observed to increase in temperature by 49.0° C. over 39 minutes. The reaction was cooled to 75° C. and 10.82 g DOWFAX 2A1 (46% active) in 10 g DI water was added. The reaction was cooled to 60° C. and 0.70 g sodium persulfate in 10 g DI water was added and the reaction was held at 60° C. for 30 minutes. The reaction was cooled to 50° C. and 0.63 g sodium sulfate in 10 g DI water was added. The reaction was cooled to 40° C. and filtered through a mesh cloth (52.8% solids).

Inventive Examples 2 and 4 were prepared by synthesizing processing aid polymers having AAEM added in the second stage of the multistage emulsion polymerization. The multistage emulsion polymerization was conducted as follows:

Inventive Example 2: 0.000224 mol AAEM per 1.0 g of Processing Aid Polymer

A 5 L round bottom flask was fitted with a stirrer, temperature controller, nitrogen line and condenser. 1245 g of deionized (DI) water, 0.1 g sodium hydroxide (50% aqueous) and 9.84 g DOWFAX 2A1 (46% active) were charged to the kettle. The mixture was warmed under a nitrogen sparge to 40° C. The sparge was switched to a sweep. A monomer mixture of 27.05 g BMA, 81.16 g BA and 569.54 g MMA was prepared, then added to the kettle. Next, a solution of 0.30 g sequestrene (5% active), 0.11 g disodium EDTA and 10 g DI water was added to the reactor. Then, 0.83 g sodium persulfate in 10 g DI water was added.

Next, a mixture of 0.10 g lykopon and 0.09 g sodium formaldehyde sulfoxylate in 10 g DI water was added. The reaction was observed to increase in temperature by 37.9° C. over 88 minutes. After reaching peak exotherm, the reaction was cooled to 40° C. Next, 39.38 g DOWFAX 2A1 (46% active) in 20 g DI water was added to the kettle. Then, a monomer mixture of 34.43 g BMA, 103.29 g BA, 724.86 g MMA and 77.66 g AAEM was prepared and added to the kettle. Next, 0.08 g sodium formaldehyde sulfoxylate in 10 g DI water was added to the kettle. Then, 0.13 g of t-butylhydroperoxide (70% active) in 10 g DI water was added to the kettle. The reaction was observed to increase in temperature by 49.6° C. over 42 minutes. The reaction was cooled to 75° C. and 10.82 g DOWFAX 2A1 (46% active) in 10 g DI water was added. The reaction was cooled to 60° C. and 0.70 g sodium persulfate in 10 g DI water was added and the reaction was held at 60° C. for 30 minutes. The reaction was cooled to 50° C. and 0.63 g sodium sulfate in 10 g DI water was added. The reaction was cooled to 40° C. and filtered through a mesh cloth (52.2% solids).

Inventive Example 4: 0.000112 mol AAEM per 1.0 g of Processing Aid Polymer

A 5 L round bottom flask was fitted with a stirrer, temperature controller, nitrogen line and condenser. 1245 g of deionized (DI) water, 0.1 g sodium hydroxide (50% aqueous) and 9.84 g DOWFAX 2A1 (46% active) were charged to the kettle. The mixture was warmed under a nitrogen sparge to 40° C. The sparge was switched to a sweep. A monomer mixture of 27.05 g BMA, 92.55 g BA and 575.23 g MMA was prepared, then added to the kettle. Next, a solution of 0.30 g sequestrene (5% active), 0.11 g disodium EDTA and 10 g DI water was added to the reactor. Then, 0.83 g sodium persulfate in 10 g DI water was added. Next, a mixture of 0.10 g lykopon and 0.09 g sodium formaldehyde sulfoxylate in 10 g DI water was added. The reaction was observed to increase in temperature by 38.6° C. over 82 minutes. After reaching peak exotherm, the reaction was cooled to 40° C. Next, 39.38 g DOWFAX 2A1 (46% active) in 20 g DI water was added to the kettle. Then, a monomer mixture of 34.43 g BMA, 117.79 g BA, 732.11 g MMA and 38.83 g AAEM was prepared and added to the kettle. Next, 0.08 g sodium formaldehyde sulfoxylate in 10 g DI water was added to the kettle. Then, 0.13 g of t-butylhydroperoxide (70% active) in 10 g DI water was added to the kettle. The reaction was observed to increase in temperature by 49.2° C. over 35 minutes. The reaction was cooled to 75° C. and 10.82 g DOWFAX 2A1 (46% active) in 10 g DI water was added. The reaction was cooled to 60° C. and 0.70 g sodium persulfate in 10 g DI water was added and the reaction was held at 60° C. for 30 minutes. The reaction was cooled to 50° C. and 0.63 g sodium sulfate in 10 g DI water was added. The reaction was cooled to 40° C. and filtered through a mesh cloth (52.8% solids).

Comparative Examples 1 and 2 were prepared by synthesizing processing aid polymers having AAEM added in both the first and second stages of the multistage emulsion polymerization. The multistage emulsion polymerization was conducted as follows:

Comparative Example 1: 0.000224 mol AAEM per 1.0 g of Processing Aid Polymer

A 5 L round bottom flask was fitted with a stirrer, temperature controller, nitrogen line and condenser. 1245 g of deionized (DI) water, 0.1 g sodium hydroxide (50% aqueous) and 9.84 g DOWFAX 2A1 (46% active) were charged to the kettle. The mixture was warmed under a nitrogen sparge to 40° C. The sparge was switched to a sweep. A monomer mixture of 27.05 g BMA, 81.16 g BA, 569.54 g MMA and 34.17 g AAEM was prepared, then added to the kettle. Next, a solution of 0.30 g sequestrene (5% active), 0.11 g disodium EDTA and 10 g DI water was added to the reactor. Then, 0.83 g sodium persulfate in 10 g DI water was added. Next, a mixture of 0.10 g lykopon and 0.09 g sodium formaldehyde sulfoxylate in 10 g DI water was added. The reaction was observed to increase in temperature by 42.4° C. over 75 minutes. After reaching peak exotherm, the reaction was cooled to 40° C. Next, 39.38 g DOWFAX 2A1 (46% active) in 20 g DI water was added to the kettle. Then, a monomer mixture of 34.43 g BMA, 103.29 g BA, 724.86 g MMA and 43.49 g AAEM was prepared and added to the kettle. Next, 0.08 g sodium formaldehyde sulfoxylate in 10 g DI water was added to the kettle. Then, 0.13 g of t-butylhydroperoxide (70% active) in 10 g DI water was added to the kettle. The reaction was observed to increase in temperature by 47.4° C. over 34 minutes. The reaction was cooled to 75° C. and 10.82 g DOWFAX 2A1 (46% active) in 10 g DI water was added. The reaction was cooled to 60° C. and 0.70 g sodium persulfate in 10 g DI water was added and the reaction was held at 60° C. for 30 minutes. The reaction was cooled to 50° C. and 0.63 g sodium sulfate in 10 g DI water was added. The reaction was cooled to 40° C. and filtered through a mesh cloth (52.5% solids).

Comparative Example 2: 0.000112 mol AAEM per 1.0 g of Processing Aid Polymer

A 5 L round bottom flask was fitted with a stirrer, temperature controller, nitrogen line and condenser. 1245 g of deionized (DI) water, 0.1 g sodium hydroxide (50% aqueous) and 9.84 g DOWFAX 2A1 (46% active) were charged to the kettle. The mixture was warmed under a nitrogen sparge to 40° C. The sparge was switched to a sweep. A monomer mixture of 27.05 g BMA, 92.55 g BA, 575.23 g MMA and 17.09 g AAEM was prepared, then added to the kettle. Next, a solution of 0.30 g sequestrene (5% active), 0.11 g disodium EDTA and 10 g DI water was added to the reactor. Then, 0.83 g sodium persulfate in 10 g DI water was added. Next, a mixture of 0.10 g lykopon and 0.09 g sodium formaldehyde sulfoxylate in 10 g DI water was added. The reaction was observed to increase in temperature by 40.3° C. over 80 minutes. After reaching peak exotherm, the reaction was cooled to 40° C. Next, 39.38 g DOWFAX 2A1 (46% active) in 20 g DI water was added to the kettle. Then, a monomer mixture of 34.43 g BMA, 117.79 g BA, 732.11 g MMA and 21.75 g AAEM was prepared and added to the kettle. Next, 0.08 g sodium formaldehyde sulfoxylate in 10 g DI water was added to the kettle. Then, 0.13 g of t-butylhydroperoxide (70% active) in 10 g DI water was added to the kettle. The reaction was observed to increase in temperature by 49.2° C. over 42 minutes. The reaction was cooled to 75° C. and 10.82 g DOWFAX 2A1 (46% active) in 10 g DI water was added. The reaction was cooled to 60° C. and 0.70 g sodium persulfate in 10 g DI water was added and the reaction was held at 60° C. for 30 minutes. The reaction was cooled to 50° C. and 0.63 g sodium sulfate in 10 g DI water was added. The reaction was cooled to 40° C. and filtered through a mesh cloth (52.6% solids).

Emulsions were converted to powder by oven drying at 60° C. Likewise the emulsions can be dried by any of the methods know to the art such as: spray drying, fluid bed drying, coagulation followed by drying, etc.

Each of the Inventive and Comparative Examples were blended with a masterbatch, prepared as set forth in Table 1.

TABLE 1

| MATERIAL | AVAILABLE FROM | PHR |
|---|---|---|
| PVC (FORMOLON F614 (K = 59)) | Formosa Plastics | 100 |
| Stabilizer (ADVASTAB TM-181) | The Dow Chemical Company | 2.5 |
| Calcium Stearate | Compton | 1.3 |
| Paraffin Wax (AMERILUBE XL 165) | American Synthol | 0.8 |
| Oxidized PE wax (AC-629) | Honeywell | 0.20 |
| Lubricant (ADVALUBE B3310) | The Dow Chemical Company | 0.60 |
| PARALOID K175 (processing aid) | The Dow Chemical Company | 2 |
| Blowing agent (FICEL ES55 HVC)* | Lanxess Co. | 0.7 |
| Titanium dioxide (TIONA RCL-4) | Millennium Chemicals | 2.5 |
| Calcium carbonate (OMYACARB UFT) | Omya Inc. | 10 |

*Blowing agent is a blend of azodicarbonamide and sodium bicarbonate.

The components were blended in a Henschel blender to make a master batch. After the PVC was charged and the blades begin turning, the blender temperature increased from frictional heating at approximately 3-5° C./min. After the PVC was charged, the remaining ingredients were added through the addition port when the temperature reached the temperatures listed below.

Charge PVC to blender at 25° C. and close lid. Turn on mixing blades at about 1000 rpm. Monitor temperature. No cooling. Add ADVASTAB TM-181 stabilizer at 52° C. Add ADVALUBE B3310, paraffin wax, XL-165, AC-629A, and calcium stearate at 66° C. Add lubricating processing aid, PARALOID K-175 and blowing agent, Ficel ES55 HVC, at 77° C. Add the Titanium dioxide and calcium carbonate at 90.degree. C. At 100° C. start cooling water flow. Reduce blade speed to near minimum (ca. 200 rpm). Cool to 45° C., turn off blades, and remove masterbatch powder from blender.

The formulated PVC was extruded on a Haake, Polylab twin screw, counter rotating extruder. Zone 1 was set at 1550° C. Zone 2 was set at 175° C. Zone 3 was set at 180° C. The die was a coat hanger type die with a 50 mm wide opening and a gap of 1 mm between the lips. The die temperature was set at 150° C. The extruder was run at 45 rpms and the PVC powder was fed into the throat of the extruder by gravity feed. Coming out of the extruder, the foamed PVC was run through a 3 roll stacked cooling setup set at 20° C. The gap between the cooling rolls was 2.79 mm.

Example processing aids were post added to the master batch at 10 parts per hundred on PVC (PHR) levels and mixed by shaking in a bag to make example formulations.

Definitions

AAEM Level: Total amount of AAEM in the polymer composition, expressed as a weight percent of the polymer processing aid.

AAEM Placement: Where the AAEM was added to the polymerization, in Stage 1, Stage 2 or both (this is a two stage polymer example).

Test Methods

Test methods include the following:

Molecular weight measurements by size exclusion chromatography (SEC) were performed as follows. Sample was prepared in tetrahydrofuran at a concentration of about 1.0 mg/mL. The samples were shaken on shaker at least overnight at room temperature. Sample solutions were filtered using 0.45 μm PTFE filter before SEC analysis.

Separations were carried out at 40 C on a liquid chromatograph consisting of an Agilent (Santa Clara, Calif.) 1100 series pump, autosampler, and refractive index (RI) detector. System control, data acquisition, and data processing were performed using Chemstation software (Agilent).

SEC separations were performed in tetrahydrofuran at a flow rate of 1.0 mL/min using two PLGel Mixed A columns (300.times.7.5 mm ID) packed with polystyrene-divinylbenzene gel purchased from Polymer Laboratories (a division of Agilent). 100 μL of sample solution with concentration of about 1.0 mg/mL was subjected for SEC separation. Weight average and number average molecular weight were recorded for each example.

Calibration: Polystyrene (PS) standards having $M_{sub.p}$ in the range 580 to 7,500,000 g/mol with concentration of about 0.5 mg/mL in tetrahydrofuran were used to construct a 10 point calibration curve (1st order) which was used to evaluate the relative M of the analyzed sample.

Solution Viscosity in Acetone: 24 g of 40.5% solids emulsion was added to an 8 oz jar containing 156 g acetone with mixing. After 2 hours of mixing, the viscosity was measured on a Brookfield DV-II viscometer using a #3 spindle at 60 rpm at room temperature. Solution viscosity is another indication of molecular weight with higher viscosity corresponding to higher molecular weight.

Density was measured on the extruded foam strips by cutting 0.75 inch by 1.25 inch pieces of foam from the strips. Density was determined using the method of ASTM D792. The thickness of the foam strips was determined by measuring the maximum thickness of the strip using a digital caliper. Gloss was measured using a 75 degree micro-gloss meter from Gardner.

The present invention may be embodied in other forms without departing from the spirit and the essential attributes thereof, and, accordingly, reference should be made to the

TABLE 2*

| Sample | AAEM (wt %) | AAEM Placement | $M_w$ | Solution Viscosity (cps) | Moles AAEM per 100 g PVC | Density (g/mL) | Gloss (75°) |
|---|---|---|---|---|---|---|---|
| Comp. Ex. 1 | 4.8% | Stages 1 & 2 | 1,370,000 | 122 | 0.00224 | 0.53 | 27 |
| Inv. Ex. 1 | 4.8% | Stage 1 | 2,234,250 | 186 | 0.00224 | 0.54 | 36 |
| Inv. Ex. 2 | 4.8% | Stage 2 | 4,050,150 | 434 | 0.00224 | 0.52 | 44 |
| Comp. Ex. 2 | 2.4% | Stages 1 & 2 | 1,571,050 | 202 | 0.00112 | 0.57 | 40 |
| Inv. Ex. 3 | 2.4% | Stage 1 | 2,318,800 | 278 | 0.00112 | 0.57 | 41 |
| Inv. Ex. 4 | 2.4% | Stage 2 | 3,987,150 | 1362 | 0.00112 | 0.57 | 47 |

*All data collected at 10 phr processing aid.

We claim:

1. A multi-stage emulsion processing aid polymer comprising:
   from 25 to 75 percent by weight of a first stage polymer portion in the multi-stage polymer which comprises units derived from at least one non-functional ethylenically unsaturated monomer in the presence of water and a surfactant in an emulsion polymerization reactor, and wherein said first polymer stage is free from any units derived from any functionalized monomers; and
   from 25 to 75 percent by weight of a second stage polymer portion in the multi-stage polymer which comprises 90 to 99.6 mole % units derived from one or more non-functional ethylenically unsaturated monomer(s) and 0.4 to 10 mole % units derived from one or more functionalized ethylenically unsaturated monomer(s) subsequently fed into the emulsion polymerization reactor in the presence of the first stage polymer, wherein the functionality is selected from the group consisting of β-keto esters, β-keto amides, β-diketones, cyanoacetic esters, malonates, nitroalkanes, β-nitro esters, sulfonazides, thiols, thiol-s-triazines, and amine, where the functionality is incorporated into second stage polymers by polymerizing, ethylenically unsaturated monomers containing these functionalities; and
   wherein the multi-stage emulsion processing aid polymer has a weight average molecular weight ($M_w$) equal to or greater than 700,000.

2. The multi-stage emulsion processing aid polymer according to claim 1 wherein the functionalized ethylenically unsaturated monomer is selected from the group of β-keto esters and amides, β-diketones, cyanoacetic esters, malonates, nitroalkanes and β-nitro esters.

3. The multi-stage emulsion processing aid polymer according to claim 1, wherein the functionalized ethylenically unsaturated monomer is selected from the group of acetoacetoxyethyl(meth)acrylate, acetoacetoxypropyl(meth)acrylate, acetoacetoxybutyl(meth)acrylate, 2,3-di(acetoacetoxy)propyl(meth)acrylate, acetoacetoxyethyl(meth)acrylamide, 2-cyanoacetoxyethyl(meth)acrylate, 2-cyanoacetoxyethyl(meth)acrylamide, N-cyanoacetyl-N-metylaminoethyl(meth)acrylate, N-(2 propionylacetoxybutyl) (meth)acrylamide.

4. The multi-stage emulsion processing aid polymer according to claim 1, wherein the functionalized ethylenically unsaturated monomer is acetoacetoxyethyl(meth)acrylate (AAEM), wherein the processing aid polymer has a Tg between 10° C. and 150° C.

5. The multi-stage emulsion processing aid polymer according to claim 4 wherein the functionalized ethylenically unsaturated monomer is acetoacetoxyethyl(meth)acrylate (AAEM), wherein the processing aid polymer has a Tg is between 55° C. and 150° C.

6. The multi-stage emulsion processing aid polymer according to claim 1 wherein the functionalized ethylenically unsaturated monomer is AAEM, wherein the processing aid polymer has a weight average molecular weight ($M_w$) equal to or greater than 1.6 million.

7. The multi-stage emulsion processing aid polymer according to claim 1 wherein the second stage comprises from 92.5 to 99.2 mole % units derived from one or more non-functional ethylenically unsaturated monomer(s) and from 0.8 to 7.5 mole % units derived from one or more functionalized ethylenically unsaturated monomer(s).

* * * * *